(12) United States Patent
Takeda et al.

(10) Patent No.: US 12,157,927 B2
(45) Date of Patent: Dec. 3, 2024

(54) METHOD FOR TREATING LITHIUM ION BATTERY WASTE

(71) Applicant: SUMITOMO METAL MINING CO., LTD., Tokyo (JP)

(72) Inventors: Kenji Takeda, Niihama (JP); Satoshi Asano, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 1149 days.

(21) Appl. No.: 16/647,932

(22) PCT Filed: Oct. 22, 2018

(86) PCT No.: PCT/JP2018/039198
§ 371 (c)(1),
(2) Date: Mar. 17, 2020

(87) PCT Pub. No.: WO2019/102764
PCT Pub. Date: May 31, 2019

(65) Prior Publication Data
US 2020/0263276 A1    Aug. 20, 2020

(30) Foreign Application Priority Data

Nov. 22, 2017 (JP) .................................. 2017-224558

(51) Int. Cl.
| | |
|---|---|
| H01M 10/54 | (2006.01) |
| B09B 3/00 | (2022.01) |
| B09B 3/40 | (2022.01) |
| C22B 15/00 | (2006.01) |
| H01M 10/0525 | (2010.01) |

(52) U.S. Cl.
CPC ............ *C22B 15/0028* (2013.01); *B09B 3/00* (2013.01); *B09B 3/40* (2022.01); *H01M 10/0525* (2013.01); *H01M 10/54* (2013.01)

(58) Field of Classification Search
CPC .. B09B 3/00; B09B 3/40; C22B 1/005; C22B 15/0028; C22B 15/0056; C22B 23/04; C22B 7/001; H01M 10/0525; H01M 10/54; Y02W 30/84
USPC ......................................................... 75/401
See application file for complete search history.

(56) References Cited

U.S. PATENT DOCUMENTS

| | | |
|---|---|---|
| 4,705,562 A | 11/1987 | Hedlund |
| 8,840,702 B2 | 9/2014 | Verscheure et al. |
| 2017/0005374 A1 | 1/2017 | Brouwer et al. |
| 2020/0216929 A1* | 7/2020 | Higaki .................... C22B 23/00 |

FOREIGN PATENT DOCUMENTS

| | | |
|---|---|---|
| JP | S61-163204 A | 7/1986 |
| JP | H10-008156 A | 1/1998 |
| JP | H10-330855 A | 12/1998 |
| JP | 3079285 B2 | 8/2000 |
| JP | 3079287 B2 | 8/2000 |
| JP | 3450684 B2 | 9/2003 |
| JP | 2012059564 A * | 3/2012 |
| JP | 2013-506048 A | 2/2013 |
| JP | 5657730 B2 | 1/2015 |
| JP | 2017-509786 A | 4/2017 |
| KR | 10-2016-0102493 A | 8/2016 |
| WO | 2011/035915 A1 | 3/2011 |
| WO | 2015/096945 A1 | 7/2015 |

OTHER PUBLICATIONS

NPL: online translation of JP2012059564A, Mar. 2012 (Year: 2012).*
Notice of Allowance mailed Aug. 20, 2019, issued for Japanese patent application No. 2017-224558 and English translation thereof.
International Search Report mailed Jan. 8, 2019, issued for PCT/JP2018/039198.

* cited by examiner

*Primary Examiner* — Jie Yang
(74) *Attorney, Agent, or Firm* — Locke Lord LLP; James E. Armstrong, IV; Nicholas J. DiCeglie, Jr.

(57) ABSTRACT

A method for treating a lithium ion battery waste according to the present invention is a method for treating a lithium ion battery waste using a converter furnace in a copper smelting process, wherein, prior to a treatment for charging a copper mat produced in a flash smelter in a copper smelting process into a converter furnace and blowing oxygen into the converter furnace to produce crude copper, the lithium ion battery waste is introduced into the converter furnace or a ladle that is used for the charging of the copper mat into the converter furnace and then the lithium ion battery waste is burned with residual heat in the converter furnace or the ladle.

2 Claims, No Drawings

METHOD FOR TREATING LITHIUM ION BATTERY WASTE

TECHNICAL FIELD

The present invention relates to a method for treating a lithium ion battery waste and to a treating method for recovering valuable metals such as copper and nickel from a lithium ion battery waste.

BACKGROUND ART

Lithium ion batteries are lightweight and also have a large battery capacity as compared to conventional nickel hydride batteries, lead storage batteries, and the like, and also have a large repetition capability, so that an application range thereof has been expanded in recent years and lithium ion batteries are used numerously. In such lithium ion batteries, those which degrade due to a decrease in charging capacity, or the like after reaching the lifetime or after being used a certain number of times, or those which are damaged are disposed of. In addition, defective products generated in the manufacturing process of lithium ion batteries are also disposed of.

Incidentally, used lithium ion batteries, defective products of batteries generated in the manufacturing process of lithium ion batteries, and the like are also collectively referred to as "lithium ion battery waste."

In lithium ion batteries, generally, an oxide of nickel, cobalt, manganese, iron, or the like is used as a positive electrode, aluminum is used as a current collector of a positive electrode, a carbon material is used as a negative electrode, and copper is used as a current collector of a negative electrode. However, the amount of respective metals used are smaller than those in nickel hydride batteries or lead storage batteries in terms of weight of the entire battery, and even if all of the respective metals are tried to be recovered, great time and cost are required, which is economically disadvantageous.

In addition, since the ratio of the amount of material of valuable metals such as nickel and copper in lithium ion batteries is relatively smaller than those in nickel hydride batteries, lead storage batteries, or the like, even if these valuable metals are tried to be recycled, profitability is inferior, and thus methods of not recycling valuable metals but discarding the valuable metals by landfill or the like are mainly used.

Further, in lithium ion batteries, an electrolyte solution using fluorine or phosphorus such as lithium fluorophosphate is used in some cases, a fluororesin is also used as a separator for a positive electrode and a negative electrode in some cases, and fluorine is used as an element. Such fluorine or phosphorus is likely to impede a recovery of metals such as nickel and copper, and particularly, has a problem in that fluorine or phosphorus remains as impurity when metals are recycled by a wet treatment and thus degrades the worthiness of recovered metals.

Herein, Patent Documents 1 to 4 have proposed methods in which a lithium ion battery waste is roasted and then finely crushed using a crusher (mill), the resulting products are separated into individual materials by a sieve or a vibrating device, and then valuable metals are recovered from the individual materials. However, in these methods, a crusher for fine crushing, a sieve for classification, a magnetic ore separator, and other separation device are necessary, and thus investment for introduction, time, effort, and electrical power for operation, expendable items, and time, effort, and cost for various kinds of maintenance or the like are necessary, which are burdensome.

Meanwhile, Patent Document 5 discloses a method in which a lithium ion battery waste is introduced into a copper smelting furnace (flash smelter) and subjected to a melting treatment (flash smelting treatment) to recover metals and an electrolyte solution to be contained is utilized as a fuel. According to such a method, it is considered that investment to various kinds of devices, time, effort, and the like can be suppressed.

However, as the technique described in Patent Document 5, when a lithium ion battery waste is introduced into a melted product of a copper smelting furnace to perform a melting treatment, in the melted product, an organic substance contained in the lithium ion battery waste, specifically, carbon constituting the organic substance becomes an oxide in the form of catching valuable metals and is inhibited to be dissolved in the melted product of copper so as to be exhausted as slag. Thus, this results in recovery loss of valuable metals.

In addition, the electrolyte solution of the lithium ion battery contains, as described above, a phosphorus or fluorine compound. For this reason, when the lithium ion battery waste is introduced into a melted product of the copper smelting furnace and then treated, phosphorus contained in the lithium ion battery waste is melted and distributed to slag, but since phosphorus easily adheres to nickel or cobalt, it is difficult to completely remove the adherent content, and thus great cost and effort for ensuring qualities of valuable metals such as nickel are necessary.

Further, fluorine contained in the lithium ion battery waste vaporizes by the melting treatment to become exhaust gas, but this gas is accumulated in the copper melted product having a heavy specific gravity to increase the volume thereof, causes bumping that the volume is abruptly increased and tried to slip out of, which increases a risk. In addition, splash (scattering) occurs in the smelting furnace so that valuable metals are attached to the furnace wall or valuable metals are incorporated in flue cinder, and thus the recovery loss of valuable metals may occur. Furthermore, fluorine to vaporize and be contained in exhaust gas is transported inside a smelting furnace or to an exhaust gas treating step and also causes corrosion of a facility to be promoted, and there is a concern of an influence to the environment through emission of fluorine to air or discharged water.

As described above, although the treating method for introducing the lithium ion battery waste in the copper smelting process to recover nickel and copper that are valuable substances is effective from the viewpoint of time, effort, and cost, the recovery loss of valuable metals may occur due to the melting treatment, and components such as phosphorus and fluorine contained in a battery may affect the recovery of valuable metals.

Patent Document 1: Japanese Patent No. 5657730
Patent Document 2: Japanese Patent No. 3079285
Patent Document 3: Japanese Patent No. 3450684
Patent Document 4: Japanese Patent No. 3079287
Patent Document 5: PCT International Publication No. WO2015/096945

DISCLOSURE OF THE INVENTION

Problems to be Solved by the Invention

The present invention has been proposed in view of such circumstances, and an object thereof is to provide a method capable of more efficiently and stably treating a lithium ion battery waste while reducing a recovery loss of valuable metals when valuable metals such as nickel and copper are recovered from a lithium ion battery waste utilizing a treatment in a copper smelting process.

Means for Solving the Problems

The present inventor has conducted intensive studies, and as a result, found that the aforementioned problems can be solved by introducing a lithium ion battery waste as a raw material into a converter furnace in a copper smelting process, burning the lithium ion battery waste utilizing residual heat remaining in the converter furnace, and then charging a copper matte, which is obtained from a flash smelter in the copper smelting process, into the converter furnace to perform a flash smelting treatment, thereby completing the present invention.

(1) A first invention of the present invention is a method for treating a lithium ion battery waste using a converter furnace in a copper smelting process, in which prior to a treatment for charging a copper matte obtained from a flash smelter in the copper smelting process into a converter furnace and blowing oxygen into the converter furnace to obtain crude copper, the lithium ion battery waste is introduced into the converter furnace or a ladle furnace that is used for charging the copper matte into the converter furnace and then the lithium ion battery waste is burned with residual heat in the converter furnace or the ladle furnace.

(2) A second invention of the present invention is the method for treating a lithium ion battery waste in the first invention, in which an amount of the lithium ion battery waste introduced into the converter furnace or the ladle furnace is adjusted such that an amount of material of fluorine contained in the lithium ion battery waste becomes an amount corresponding to 10 ppm or more and less than 35 ppm with respect to an amount of material of copper to be supplied to the converter furnace in the copper smelting process.

(3) A third invention of the present invention is the method for treating a lithium ion battery waste in the first or second invention, in which the lithium ion battery waste is discharged to remove an electrolyte solution contained in the discharged lithium ion battery waste and then the lithium ion battery waste is introduced into the converter furnace or the ladle furnace and is burned.

Effects of the Invention

According to the present invention, in a treatment for recovering valuable metals from a lithium ion battery waste, the lithium ion battery waste can be more efficiently and stably treated while reducing a recovery loss of valuable metals.

Preferred Mode for Carrying Out the Invention

Hereinafter, specific embodiments of the present invention will be described in detail. Incidentally, the present invention is not limited to the following embodiments, and various modifications are possible without changing the gist of the present invention. In addition, in the present specification, "X to Y" (X and Y are arbitrary numerical values) means "X or more and Y or less."

The present invention is a method for treating a lithium ion battery waste, the treating method for recovering valuable metals from the lithium ion battery waste. Herein, the "lithium ion battery waste" is a general term of scraps such as a waste material generated in the used lithium ion battery or in a process for manufacturing a lithium ion battery. The treating method according to the present invention is a treating method for recovering valuable metals such as nickel and copper from the lithium ion battery waste.

Specifically, the method for treating a lithium ion battery waste according to the present invention is a treating method utilizing a converter furnace in a copper smelting process, in which prior to a treatment for charging a copper matte obtained from a flash smelter in the copper smelting process into a converter furnace and blowing oxygen into the converter furnace to obtain crude copper, the lithium ion battery waste is introduced into the converter furnace or a ladle furnace that is used for charging the copper matte into the converter furnace and then the lithium ion battery waste is burned with residual heat in the converter furnace or the ladle furnace.

In this way, the method for treating a lithium ion battery waste according to the present invention utilizes a converter furnace or a ladle furnace using in a copper smelting process, and prior to a general treatment in the converter furnace, that is, a treatment for charging a copper matte obtained from a flash smelter in the copper smelting process into the converter furnace and blowing oxygen into the converter furnace to obtain crude copper, the lithium ion battery waste is introduced into the converter furnace or the ladle furnace and lithium ion battery waste is subjected to a burning treatment with residual heat in the converter furnace or the ladle furnace. In the burning treatment, the converter furnace or the ladle furnace is in an empty state in which a copper matte or the like is not contained, and the treatment is performed in a so-called dry-boil state with residual heat thereof. Incidentally, after the burning treatment, the copper matte is charged into the converter furnace and then a melting treatment is performed.

That is, even in a treatment utilizing a smelting furnace in the copper smelting process, the lithium ion battery waste is not introduced in a melted product in the smelting furnace (herein, the converter furnace), but the lithium ion battery waste is charged into the converter furnace or the ladle furnace before the melting treatment and is burned with residual heat in the converter furnace or the ladle furnace. According to such a method, since the lithium ion battery waste is burned in the converter furnace and the ladle furnace, an organic substance contained in the lithium ion battery waste is almost removed, it is possible to prevent carbon constituting the organic substance from becoming an oxide in a state of being incorporated in the melted product and catching valuable metals. Further, bumping or generation of splash caused by vaporizing gas in the melted product can be suppressed. According to this, the recovery loss of valuable metals can be effectively prevented.

Further, preferably, when the lithium ion battery waste is introduced into the converter furnace or the ladle furnace, the introduced amount thereof is adjusted. Specifically, the amount of the lithium ion battery waste introduced is preferably adjusted such that the amount of material of fluorine contained in the lithium ion battery becomes an amount corresponding to 10 ppm or more and less than 35 ppm with respect to an amount of material of copper to be supplied to the furnace in the copper smelting process.

As described above, when the lithium ion battery waste is introduced into the converter furnace or the ladle furnace and is subjected to a burning treatment with residual heat prior to a general treatment in the converter furnace, since fluorine contained in the lithium ion battery waste vaporizes to become exhaust gas, bumping or generation of splash subsequently occurring in the melted product of the converter furnace can be suppressed; however, more preferably, by adjusting the amount of the lithium ion battery waste introduced on the basis of the amount of material of fluorine thereof, the fluorine concentration in exhaust gas to be generated can also be suppressed.

In particular, in a copper smelter provided with a converter furnace, an exhaust gas facility is an important facility for converting sulfur content contained in a raw material into sulfuric acid, but it is important that an influence of fluorine to vaporize and be contained in exhaust gas to the facility is reduced as much as possible. From this point, by adjusting the amount of the lithium ion battery waste introduced, that is, the burning treatment amount of the lithium ion battery waste in the converter furnace or the ladle furnace on the basis of the amount of material of fluorine to be contained, the corrosion of the facility caused by fluorine can be effectively prevented. Further, an influence in an environment aspect can also be reduced.

Hereinafter, more specifically, the method for treating a lithium ion battery waste according to the present invention will be sequentially described.

(Treatment for Discharging and Removing of Electrolyte Solution)

In the treating method according to the present invention, preferably, first, the lithium ion battery waste to be treated is discharged and then an electrolyte solution contained in the discharged lithium ion battery waste is removed. Incidentally, a product obtained by discharging the lithium ion battery waste or a product obtained by removing an electrolyte solution thereafter is referred to as the "lithium ion battery waste."

In the lithium ion battery, phosphorus is mainly contained as a component of the electrolyte solution. When valuable metals such as nickel and copper are recovered from the lithium ion battery waste, phosphorus is easily mixed as impurities of these valuable metals. From this point, by discharging the lithium ion battery waste and then removing the electrolyte solution contained in the discharged lithium ion battery waste before performing a burning treatment described later, it is possible to reduce a possibility that phosphorus is mixed in the recovery of valuable metals.

A discharging treatment can be performed, for example, by using a discharged liquid such as an aqueous sodium sulfate solution or an aqueous sodium chloride solution and immersing the lithium ion battery waste in the aqueous solution. By such a discharging treatment, an electrolyte or electrolyte solution component contained in the lithium ion battery waste is eluted in the aqueous solution and detoxified.

Further, a method for removing the electrolyte solution that is an organic substance contained in the discharged lithium ion battery waste is not particularly limited, but for example, the removing method can be performed by a treatment for extracting the electrolyte solution by forming a hole or applying partial cracking to a casing (case) which is formed by plastics or the like of the lithium ion battery waste, in advance. Since the electrolyte solution can be easily removed by such a treatment, it is not necessary to completely separate the casing in which crushing, cracking, or the like has been performed and a battery main body, and the treatment can be reduced to become about half or lower. Further, since the burning treatment is performed at a high temperature in the converter furnace or the ladle furnace, as described later, even by such a simple treatment, an organic substance or the like is thermally decomposed or burned with the heat to be sufficiently removed. Further, a preliminary treatment (preliminary burning treatment) for introducing the lithium ion battery waste into a small furnace provided separately and thermally decomposing the electrolyte solution in the furnace may be performed before introducing the lithium ion battery waste into the converter furnace in the copper smelting process, and according to this, the treatment in the converter furnace can be further stably performed, which is preferable.

Incidentally, the treatment for removing the electrolyte solution can be performed by a treatment for washing the lithium ion battery waste with a washing liquid such as water or alcohol. For example, since an organic solvent such as ethylene carbonate, propylene carbonate, diethyl carbonate, or dimethyl carbonate and an electrolyte such as lithium hexafluorophosphate (LiPF6) are contained in the lithium ion battery waste, these components are washed and removed with alcohol or the like, so that mixing of phosphorus or fluorine as impurity can be more efficiently prevented.

(Introduction into Converter Furnace or Ladle Furnace and Burning Treatment)

In the treating method according to the present invention, the lithium ion battery waste is treated using a converter furnace in the copper smelting process, but before executing a general treatment in the converter furnace, that is, a treatment for charging a copper matte obtained from a flash smelter in the copper smelting process into the converter furnace and blowing oxygen into the converter furnace to obtain crude copper, the lithium ion battery waste is introduced into the converter furnace before the copper matte is charged or the ladle furnace that is used for charging the copper matte in the converter furnace.

Then, in the converter furnace or the ladle furnace into the lithium ion battery waste is introduced, by utilizing residual heat existing in the converter furnace or the ladle furnace, the introduced lithium ion battery waste is burned. At this time, the converter furnace or the ladle furnace is in an empty state in which a copper matte or the like is not contained, and the burning treatment is performed in a so-called dry-boil state with residual heat remaining in the converter furnace or the ladle furnace. The converter furnace or the ladle furnace in the copper smelting process holds considerably high-temperature heat (for example, heat at a high temperature of about 500° C. to 1100° C.) even when the empty state is maintained by the repetitive operation. Heat remaining in the converter furnace and the ladle furnace which is in such an empty state is referred to as "residual heat," the burning treatment is performed with respect to the lithium ion battery waste by this residual heat.

At this time, as described above, the copper matte is not charged into the converter furnace, as a matter of fact, the melting treatment that is a treatment in a general converter furnace is not performed with respect to the copper matte, and thus a state in which no melted product exists is created.

Herein, the converter furnace in the copper smelting process is a smelting furnace in which copper is condensed from the copper matte recovered from the flash smelter to smelt crude copper. In this converter furnace, the recovered copper matte is charged and oxygen is blown with respect to this copper matte, so that FeS in the copper matte is subjected to an oxidation treatment to generate converter furnace slag and a copper sulfide in the copper matte is precipitated and separated. Further, by subjecting this copper sulfide to the oxidation treatment, crude copper is generated.

Since the copper matte obtained by melting copper is received in the converter furnace in the copper smelting process, the temperature in the converter furnace is a temperature exceeding 1086° C. that is a melting point of copper, and oxidation heat is also generated in a general converter furnace during a melting reaction, so that a higher-temperature state is created. The same also applies in the ladle furnace. Furthermore, when the converter furnace or the ladle furnace is in an empty state, if the furnace is cooled to about room temperature, since a constituent material such as a brick is damaged by heat shock, it is general that the furnace has a temperature of at least 500° C. or higher at the time of reaction and is kept to a temperature equal to or higher than the temperature even in an empty state.

Incidentally, a furnace that is used when the copper matte is charged into the converter furnace is a ladle furnace and is a facility in which the copper matte exhausted from the flash smelter is received and is conveyed to the converter furnace while hanging the ladle furnace with crane, and the copper matte is charged into the converter furnace by the ladle furnace being inclined. This ladle furnace is also referred to as a "ladle."

Further, the flash smelter in the copper smelting process (incidentally, also described as "flash smelter") is a smelting furnace in which a smelting raw material such as sulfide concentrate is melted to condense copper contained in this raw material. In this flash smelter, the smelting raw material such as sulfide concentrate is blown along with preheated gas for reaction into a reaction tower from a concentrate burner and is melted by reaction with high-temperature gas for reaction. By such a reaction, a copper matte mainly containing a sulfide of copper and slag mainly containing $2FeO.SiO_2$ are separated by difference in specific gravity.

As described above, in the treating method according to the present invention, before executing a general treatment in the converter furnace, that is, a treatment for charging a copper matte obtained from a flash smelter in the copper smelting process into the converter furnace and blowing oxygen into the converter furnace to obtain crude copper, the lithium ion battery waste is introduced into the converter furnace before the copper matte is charged or the ladle furnace that is used for charging the copper matte in the converter furnace. Then, in the converter furnace or the ladle furnace, since residual heat is contained in the converter furnace or the ladle furnace, the lithium ion battery waste introduced into the converter furnace or the ladle furnace is burned with residual heat.

In such a treatment, for example, since burning occurs at a high temperature of about 500° C. to 1100° C., an organic substance or the like contained in the lithium ion battery easily vaporizes to be removed, and then in the melting treatment in which the copper matte has been charged into the converter furnace, it is possible to prevent carbon constituting the organic substance from becoming an oxide in a state of catching valuable metals.

Further, by subjecting the lithium ion battery waste to the burning treatment, adhesion of phosphorus contained in the lithium ion battery waste to valuable metals such as copper and nickel can be suppressed, and qualities of valuable metals such as nickel can also be increased. Further, since fluorine contained in the lithium ion battery waste also vaporizes by burning to become exhaust gas, it is possible to prevent that the fluorine is incorporated in the melting treatment in which the copper matte has been charged into the converter furnace at the subsequent process, and to prevent that bumping or the like occurs in the copper melted product.

The amount of the lithium ion battery waste introduced into the converter furnace or the ladle furnace is not particularly limited, but is preferably adjusted on the basis of the amount of material of fluorine contained in the lithium ion battery waste. Specifically, the amount of the lithium ion battery waste introduced is preferably introduced such that the amount of material of fluorine contained in the lithium ion battery waste becomes an amount corresponding to 10 ppm or more and less than 35 ppm with respect to an amount of material of copper to be supplied to the converter furnace in the copper smelting process. Further, the introduced amount thereof is more preferably adjusted to become an amount of 20 ppm or more and 30 ppm or less with respect to the amount of material of copper to be supplied to the converter furnace in the copper smelting process.

The "amount of material of copper to be supplied to the converter furnace in the copper smelting process" does not mean an amount of copper contained in the lithium ion battery waste to be treated but means an amount of copper in a raw material (copper matte) to be provided to a treatment in a general converter furnace in the copper smelting process.

As described above, fluorine is contained in the lithium ion battery waste, and when the lithium ion battery waste is introduced in the converter furnace or the ladle furnace and subjected to the burning treatment, this fluorine vaporizes to become exhaust gas. At this time, in the case of performing the treatment in an uncertain introduced amount, the concentration of fluorine in the exhaust gas may be increased too much, and this may exert an influence such as corrosion with respect to an exhaust gas system of the converter furnace. From this point, by adjusting the amount of the lithium ion battery waste introduced into the converter furnace or the ladle furnace to the aforementioned range, the influence to the exhaust gas system can be prevented and the influence to the copper smelting process is also eliminated so that the treatment operation can be stably performed.

When the amount of the lithium ion battery waste introduced is increased to be introduced such that the amount of material of fluorine contained in the lithium ion battery waste becomes 35 ppm or more with respect to the amount of material of copper to be supplied to the converter furnace in the copper smelting process, the concentration of fluorine, which vaporizes by the burning treatment in the converter furnace or the ladle furnace to become exhaust gas, in the exhaust gas system of the smelting furnace is increased, and thus an influence to the exhaust gas system may arise. Further, there is a possibility of the amount exceeding an emission standard to the environment, it is necessary to adjust the introduced amount, and as a result, there is a possibility that the operation cannot be efficiently performed.

On the other hand, in the condition that the amount of the lithium ion battery waste introduced is reduced and the amount of material of fluorine contained in the lithium ion battery waste becomes less than 10 ppm with respect to the amount of material of copper to be supplied to the converter furnace in the copper smelting process, there is no influence to an original converter furnace for smelting copper, but there is possibilities that the amount of the lithium ion battery waste that can be treated is decreased to lower productivity and a practical operation cannot be performed.

(Melting Treatment in Converter Furnace in Copper Smelting Process)

Next, in the treating method according to the present invention, a melting treatment (flash smelting treatment) for charging a copper matte into the converter furnace to generate crude copper in a general copper smelting process is performed. Herein, the copper matte mainly contains a sulfide of copper generated and recovered in the flash smelter in the copper smelting process and is a raw material for generating crude copper in the converter furnace.

In the treating method according to the present invention, as described above, prior to a general treatment in the converter furnace, the burning treatment utilizing residual heat in the converter furnace or the ladle furnace is performed. For example, in the case of performing the burning treatment in the converter furnace, the copper matte is charged into the converter furnace after the burning treatment to perform a melting treatment. Further, in the case of performing the burning treatment in the ladle furnace, the copper matte is charged into the converter furnace while the lithium ion battery waste after the burning treatment is introduced into the converter furnace to perform a melting treatment.

The melting treatment in the converter furnace may be performed in the similar manner to the treatment in a general converter furnace in the copper smelting process, and specifically, a raw material (copper matte) is charged into the converter furnace, and oxidation is performed while blowing oxygen, thereby generating crude copper.

By such a melting treatment in the converter furnace, valuable metals such as copper and nickel which are to be treated and are contained in the lithium ion battery waste are contained in crude copper generated from the converter furnace, and the valuable metals can be more effectively recovered by a subsequent copper purification treatment.

Herein, in the treating method according to the present invention, the melting treatment including the lithium ion battery waste in the converter furnace in the copper smelting process is performed, but prior to this melting treatment, the lithium ion battery waste is subjected to the burning treatment utilizing residual heat in the converter furnace or the ladle furnace, and thus in the melting treatment, the lithium ion battery waste in a state in which an organic substance or the like is removed is treated in the melting treatment. From this, it is possible to prevent that carbon constituting the organic substance transitions to converter furnace slag in the form of the carbon catching valuable metals, and the recovery loss of the valuable metals can be suppressed.

Further, since various gases are generated and exhausted under atmospheric pressure by the burning treatment prior to the melting treatment, it is possible to prevent bumping or generation of splash or the like at the time of the melting treatment by the gases. According to this, it is possible to execute a copper smelting treatment with higher safety and to more effectively suppress the recovery loss of valuable metals.

Incidentally, valuable metals such as copper and nickel which are to be treated and are contained in the lithium ion battery waste are contained in crude copper obtained by the melting treatment in the converter furnace in the copper smelting process, but by subjecting the obtained crude copper to a purification treatment by a known method such as electrolytic smelting, the valuable metals can be separated and recovered as high-purity copper or nickel metal. Alternatively, the valuable metals can also be effectively recovered as the form of a sulfate salt of copper or nickel by the purification treatment.

Further, other than copper or nickel mentioned above, for example, cobalt, aluminum, iron, or the like is also contained in the lithium ion battery waste, but in order to separate and recover those components, considerable cost is required in energy, drugs, or the like. Therefore, recovering is performed when copper or nickel, which is easily recovered by a treatment utilizing the converter furnace in the copper smelting process, is targeted, it is possible to suppress the cost to be low and to efficiently recover valuable metals.

EXAMPLES

Hereinafter, the present invention will be described in more detail be means of Examples, but the present invention is not limited to the following Examples at all.

Example 1

A waste product, which had been used, of a commercially available lithium ion battery was discharged using a known method and subjected to a detoxifying treatment, and a hole was formed in a battery case, and then an electrolyte solution was removed therefrom. Incidentally, the lithium ion battery was used as a raw material without the battery case or the like being separated.

Next, the lithium ion battery waste (raw material) which was detoxified and from which the electrolyte solution was removed was introduced into the converter furnace in the copper smelting process to perform the burning treatment. Herein, the converter furnace is in a general state in the copper smelting process, that is, a state before performing a treatment for charging the copper matte and blowing oxygen to generate crude copper, and is in an empty state in which the copper matte is charged. This converter furnace is in a state of holding heat by the repetitive operation of the copper smelting process. Therefore, by the residual heat, the introduced lithium ion battery waste was burned.

Further, the lithium ion battery waste was introduced by adjusting the amount of the lithium ion battery waste introduced into the converter furnace such that the amount of material of fluorine contained in the lithium ion battery waste became an amount corresponding to 30 ppm with respect to the amount of material of copper to be supplied to the converter furnace in the copper smelting process.

After the burning treatment, the copper matte was charged into the converter furnace, and a general treatment (melting treatment) in the converter furnace in the copper smelting process was executed, thereby generating crude copper.

In such a series of treatments, no trouble in the exhaust gas system of the converter furnace was generated at all. The reason for this is considered that, when the lithium ion battery waste is introduced into the converter furnace, the introduced amount thereof is adjusted on the basis of the amount of material of fluorine.

Subsequently, the crude copper generated and recovered from the converter furnace was molded into a purified anode without any changes. Then, the molded purified anode was charged into an electrolysis tank in which an electrolyte solution of a sulfuric acid solution (liquid temperature: 60° C.) is filled at a composition of a copper concentration of 45 g/L and a free sulfuric acid concentration of 190 g/L to form an anode, a stainless steel cathode plate was charged into the facing surface, and a current having a current density of 300 A/$m^2$ was allowed to flow between the anode and the cathode, thereby electrocrystallizing and recovering copper on the cathode.

Further, the electrolyte solution after recovering copper was condensed, nickel was crystalized and recovered by crystals of nickel sulfate, further dissolved, and purified by a means such as solvent extraction to obtain high-purity nickel sulfate.

Comparative Example 1

In Comparative Example 1, similarly to Example 1, the lithium ion battery waste (raw material) was introduced into the converter furnace to perform the burning treatment, and then the copper matte was charged into the converter furnace to perform a general melting treatment in the copper smelting process. At this time, the lithium ion battery waste was introduced by adjusting the amount of the lithium ion battery waste introduced into the converter furnace such that the amount of material of fluorine contained in the raw material of the lithium ion battery became an amount corresponding to 50 ppm with respect to the amount of material of copper to be supplied to the converter furnace in the copper smelting process. Incidentally, the treatment was performed in the similar manner to Example 1 except for the above-described matters.

There was no influence to copper and nickel recovered after obtaining crude copper by the melting treatment in the converter furnace, but since the fluorine concentration was increased in the exhaust gas system of the converter furnace and exceeded an allowable standard at which the fluorine could be exhausted, it was necessary to suppress the amount of the lithium ion battery waste introduced into the converter furnace. In this way, the operation efficiency in terms of the introduced amount, operation stabilization, or the like was reduced.

The invention claimed is:

1. A method for treating a lithium ion battery waste in a copper smelting process, the method comprising the steps of:

introducing the lithium ion battery waste into a converter furnace or a ladle furnace, wherein the converter furnace or the ladle furnace is in a state in which a copper matte is not contained;

burning the lithium ion battery waste in the converter furnace or the ladle furnace to remove organic substances and fluorine contained in the lithium ion battery waste;

charging a copper matte obtained from a flash smelter in the copper smelting process into the converter furnace or the ladle furnace after burning the lithium ion battery waste;

blowing oxygen into the converter furnace or the ladle furnace after charging with the copper matte to obtain crude copper; wherein an amount of the lithium ion battery waste introduced into the converter furnace or the ladle furnace is adjusted such that an amount of material of fluorine contained in the lithium ion battery waste becomes an amount corresponding to 10 ppm or more and less than 35 ppm with respect to an amount of material of copper to be supplied to the converter furnace in the copper smelting process.

2. The method for treating a lithium ion battery waste according to claim 1, further comprising a step wherein, prior to introducing the lithium ion battery waste to the converter furnace or the ladle furnace, the lithium ion battery waste is discharged to remove an electrolyte solution contained in the discharged lithium ion battery waste.

* * * * *